(12) United States Patent
Happel

(10) Patent No.: US 6,428,692 B2
(45) Date of Patent: Aug. 6, 2002

(54) IN-LINE STORM WATER DRAIN FILTER SYSTEM

(76) Inventor: Henry Happel, 140 Ruby St., Rockledge, FL (US) 32955

( * ) Notice: Subject to any disclaimer, the term of this patent is extended or adjusted under 35 U.S.C. 154(b) by 0 days.

(21) Appl. No.: 09/859,714

(22) Filed: May 17, 2001

Related U.S. Application Data

(60) Provisional application No. 60/207,397, filed on May 30, 2000.

(51) Int. Cl.[7] .............................. B01D 35/02; E03F 5/14
(52) U.S. Cl. ...................... 210/155; 210/162; 210/170; 210/305; 210/307; 210/521; 210/532.1
(58) Field of Search .................... 210/155, 162, 210/259, 299, 305, 307, 310, 323.1, 521, 532.1, 170, 474

(56) References Cited

U.S. PATENT DOCUMENTS

| | | | | |
|---|---|---|---|---|
| 1,349,734 A | * | 8/1920 | Riley | 210/155 |
| 2,796,988 A | * | 6/1957 | Löffler | 210/307 |
| 3,374,894 A | * | 3/1968 | Webster | 210/305 |
| 4,297,219 A | * | 10/1981 | Kirk et al. | 210/155 |
| 4,488,835 A | * | 12/1984 | Eicher | 210/162 |
| 5,419,838 A | * | 5/1995 | DiTullio | 210/170 |
| 5,498,331 A | * | 3/1996 | Monteith | 210/170 |
| 5,779,888 A | * | 7/1998 | Bennett | 210/162 |
| 6,077,448 A | * | 6/2000 | Tran-Quoc-Nam et al. | 210/532.1 |
| 6,086,756 A | * | 7/2000 | Roy | 210/162 |
| 6,190,545 B1 | * | 2/2001 | Williamson | 210/305 |

* cited by examiner

*Primary Examiner*—Christopher Upton
(74) *Attorney, Agent, or Firm*—William M. Hobby, III

(57) ABSTRACT

An in-line storm water drain filter and baffle box is installed within a storm water drain pipe to direct storm water runoff through the storm water drain pipe and through the filter and baffle box prior to the storm water drain water passing through an outfall into a lake, pond or retention area. The filter system includes a housing having an inlet and an outlet and a plurality of chambers formed therein. A housing cover allows for access into the housing and a plurality of filter screens are mounted over each of the plurality of housing chambers for collecting trash from the storm water passing therethrough. The housing has a generally arcuate bottom. The filter system also has inlet and outlet cover frames for holding removably mounted blocker dampers for blocking the ingress and egress of storm drain water during cleaning of the filter system. An oil collection boom is removably mounted in the housing adjacent the inlet for collecting oil in the drain water entering the housing inlet. A method of cleaning the storm water drain filter system selects the filter system apparatus and blocks the egress and ingress of drain water while the system is being cleaned.

13 Claims, 1 Drawing Sheet

IN-LINE STORM WATER DRAIN FILTER SYSTEM

This application claims the benefit of U.S. provisional application No. 60/207,397, filed May. 30, 2000.

BACKGROUND OF THE INVENTION

The present invention is an in-line storm water drain filter and baffle box having a by-pass filter separator. The filter box is installed within a storm water drain pipe which directs storm water runoff through the storm water drainpipe and through the filter and baffle box prior to the storm water drain water passing through an outfall into a lake, pond or retention area. The drain water, which is frequently laden with trash, grass clippings, tree limbs, sand, gravel, and other forms of sediment, is collected from streets, parking lots and other areas into a storm drain inlet where it is directed into a storm water drain pipe system. The drain water laden with trash and grass clippings, sand and gravel and frequently oil collected from the streets is fed through a grated entrance into a storm water catch basin and into a lake or retention pond. The retention pond can tolerate a certain amount of grass clippings but cannot tolerate hydrocarbons generated from vehicles used in parking lots or along the street. Rain on the paved surface of streets and parking lots moves accumulated oil on the street into the storm water drain system and into lakes and retention ponds.

The present invention is added directly to the storm water drain pipe system in-line with the drainage pipes for collecting trash, grass clippings, tree limbs, sand, gravel, or other sorts of sediments and for collecting oil and hydrocarbons within the drain water passing through the drainage pipe system prior to the outfall of the drainage water into a lake or pond. The present system also provides for an easy cleaned of the filter system.

SUMMARY OF THE INVENTION

An in-line storm water drain filter and baffle box is installed within a storm water drain pipe to direct storm water runoff through the storm water drain pipe and through the filter and baffle box prior to the storm water drain water passing through an outfall into a lake, pond or retention area. The filter system includes a housing having an inlet and an outlet and a plurality of chambers formed therein. A housing cover allows for access into the housing and a plurality of filter screens are mounted over each of the plurality of housing chambers for collecting trash from the storm water passing therethrough. The housing has a generally arcuate bottom. The filter system also has inlet and outlet cover frames for holding removably mounted blocker dampers for blocking the ingress and egress of storm drain water during cleaning of the filter system. An oil collection boom is removably mounted in the housing adjacent the inlet for collecting oil in the drain water entering the housing inlet. A method of cleaning the storm water drain filter system selects the filter system apparatus and blocks the egress and ingress of drain water while the system is being cleaned.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
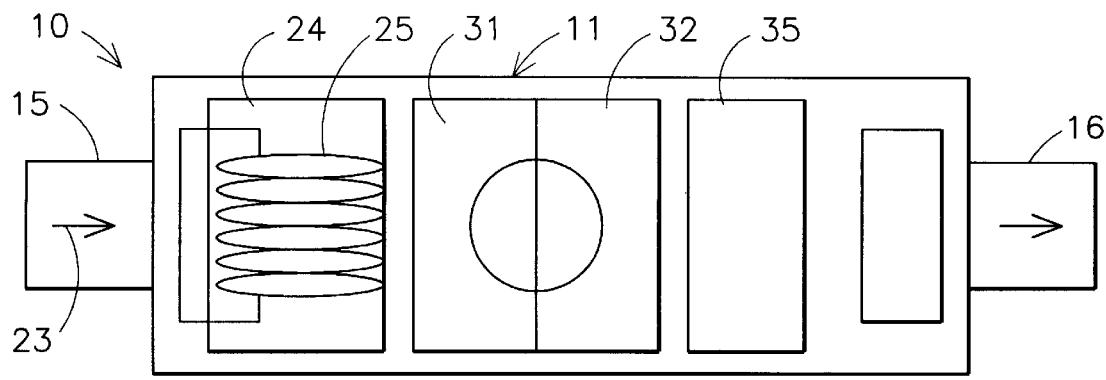
FIG. 1 is a top elevation of a storm drain filter system in accordance with the present invention.
Figure 2:
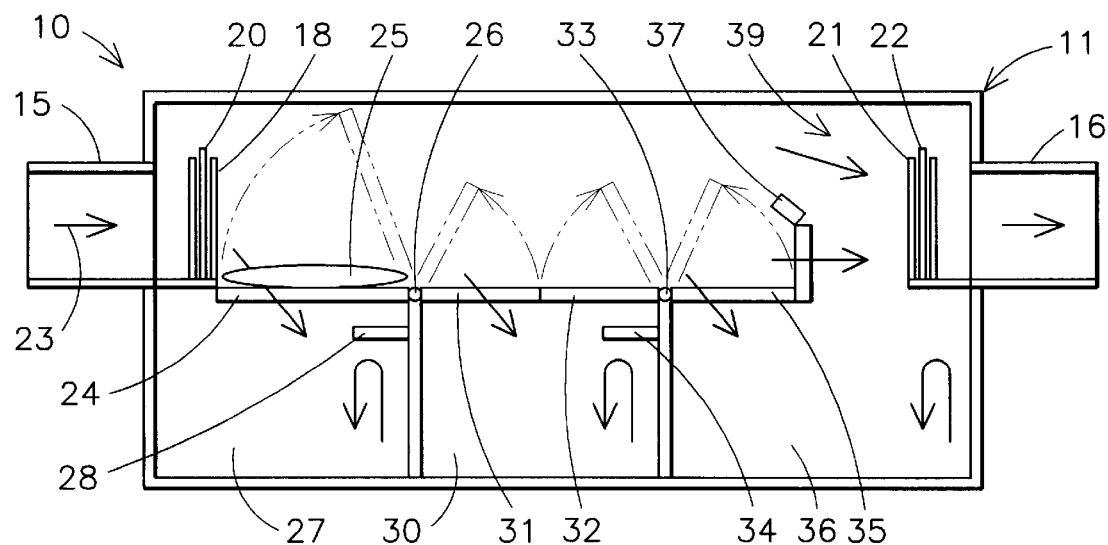
FIG. 2 is a side sectional view taken through a storm elevation system of FIG. 1.
Figure 3:
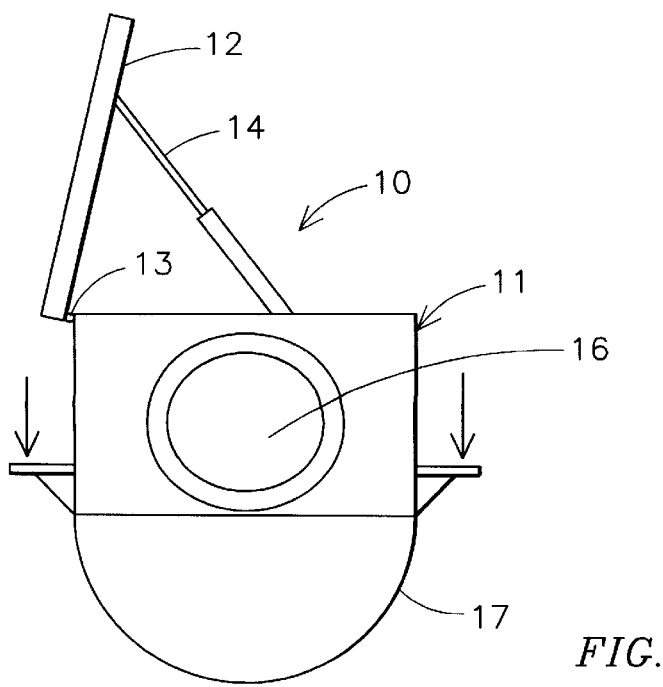
FIG. 3 is an end elevation of the filter box of FIGS. 1 and 2 having a cleaned top open.

Referring to FIGS. 1 through 3, a baffle and filter box 10 may have a concrete or plastic housing 11 having a cover or top 12 which is hinged at 13 to the top of the housing 11 and supported with a pneumatic cylinder support 14. The housing 11 has an inlet 15 sized to connect directly to a storm water drain pipe at one end and an outlet 16 at the other end thereof for connecting to a second storm water drain pipe. The housing 11 has a rounded bottom 17 for fast easy cleaning of the filter box when the top 12 is raised for cleaned. Inside the housing is a frame 18 adjacent the input 15 for removably holding a slide-in fiberglass locking damper 20 and a second frame 21 is positioned in front of the output 16 to the housing 11 for supporting a second slide-in fiberglass blocking damper 22 for use when cleaning out the filter box 10.

Drainage water laden with trash, sediment and other deposits enters, as shown by the arrow 23, into the housing and passes through a horizontally extending filter grill 24 and through an oil boom 25 containing material for absorbing hydrocarbons and oil passing within the water, which boom is placed over the filter screen 24. The screen 24 is hinged with a hinge 26 for lifting the door for cleaning out the chamber 27. The water passes through the chamber 27 while collecting sediment and a sediment flow deflector 28 blocks the circular flow of the water containing sediments to maintain the heavier sediments in the bottom of the chamber 27. The water flows into a second chamber 30 having a pair of filter screens 31 and 32 thereover. Filter screen 31 folds on a hinge 26 while filter screen 32 folds on a hinge 33, as illustrated by the arrows in FIG. 2. The drain water passing through the filter screens 31 and 32 into the chamber 30 is directed in a circular motion so that the chamber 30 also has a sediment flow deflector 34 therein. The storm water fluid passes through a fourth filter screen 35 hinged on the hinge 33 to direct the storm water into the chamber 36. There is a trash deflector screen 37 mounted to deflect trash from overflowing into the exit pipe 16. Thus, grass leaves, pieces of trees and the like is captured by the screens 30, 31, 32 and 35 and held above the chambers 27, 30 and 36 while sand, gravel, and sediments are washed into the chambers 27, 30, and 36. The oil booms 25 will capture oil and hydrocarbon residues passing thereinto to filter it from the water. If the filters get sufficiently stopped up, there is an overflow area 37 to allow the liquid to overflow to the output 16 without blocking the drain pipe.

Cleaning out the filter system of FIGS. 1 through 3 requires that the cover 12 be raised, as shown in FIG. 3, and supported in an open position with the pneumatic cylinder 14 and inserting the blocking dampers 20 and 22 into the frames 18 and 21 to stop all water flow in both directions while cleaning the filter system. This feature is especially important when the baffle and filter box 10 is installed below the water level. Prior art filter boxes are square boxes and the round bottom 17 of box 11 makes it easier to clean out the bottom. Once the input and output ends have been blocked with the temporary blocking dampers 20 and 22, the oil boom 25 can be removed and trash collected onto the filter screens 24, 31, 32 and 35 can be removed. The screens are rotated on their hinges to allow the cleaned of the rounded bottom of the filter box. This is accomplished by pumping out the sediment prior to closing the grills on their hinges and replacing the oil boom 25. The blocking dampers 20 and 22 are then removed and the cover 12 closed.

In the past, baffle boxes had to be pumped out with a large van truck while the water was still flowing through the box being cleaned which, in many cases, allowed these trucks to withdraw large amounts of water with the sediment and trash being removed from the boxes so that the truck fills with water before the trash is pumped out. This is avoided with the present invention which places blocking dampers at each end of the box during cleaning and which allows a rapid cleaned by virtue of the rounded bottom and hinged aluminum screens. Sediment flow deflectors are used to maintain the sediment in the boxes while the grass, leaves, and organic materials are supported on the filter screens.

It should be clear at this time that a baffle box having a bypass filter, separators and oil booms has been provided which allows for an easier cleaned of the baffle box and more effectively filtering within the storm drain line of a storm drain water system. However, the present invention is not to be construed as limited to the forms shown which are to be considered illustrative rather than restrictive.

I claim:

1. An in-line storm water drain filter system comprising:
   a housing having an inlet thereinto and an outlet therefrom and having a plurality of chambers formed therein below said inlet;
   a housing cover for access into said housing;
   a filter screen mounted over each of a plurality of said housing chambers for collecting trash from said storm water passing therethrough, each said filter screen being movable to allow access to the housing chamber therebeneath;
   an inlet filter screen removably mounted adjacent said housing inlet for filtering drain water entering said inlet; and
   an oil sorbent boom removably mounted in said housing above one said housing chamber for collecting oil in the drain water entering said housing inlet; whereby an in-line storm water drain filter system filters materials from drain water passing through said storm water drain.

2. An in-line storm water drain filter system in accordance with claim 1 including a baffle for maintaining sediments located within each of a plurality of said housing chambers.

3. An in-line storm water drain filter system in accordance with claim 2 in which each said filter screen mounted over each said chamber is hinged to said housing to allow said filter screen to swing to an open position for entrance to said chamber.

4. An in-line storm water drain filter system in accordance with claim 3 including an outlet filter screen removably mounted adjacent said housing outlet for filtering drain water egressing from said housing.

5. An in-line storm water drain filter system in accordance with claim 4 including an inlet filter screen frame mounted adjacent said inlet for removably holding said inlet filter screen.

6. An in-line storm water drain filter system in accordance with claim 5 including an output filter screen frame mounted adjacent said output for removably holding said outlet filter screen.

7. An in-line storm water drain filter system in accordance with claim 6 including a trash deflector member positioned adjacent the chamber covering the screen positioned nearest said outlet for deflecting trash from said outlet.

8. An in-line storm water drain filter system in accordance with claim 7 in which each of said plurality of filter screens mounted over a plurality of housing chambers is positioned in a generally horizontal row to received drain water directly thereunto from said inlet.

9. An in-line storm water drain filter system in accordance with claim 8 in which said inlet filter screen is mounted over said inlet and generally perpendicular to said plurality of filter screens.

10. An in-line storm water drain filter system in accordance with claim 9 in which said outlet filter screen is mounted over said outlet and generally perpendicular to said plurality of filter screens.

11. An in-line storm water drain filter system in accordance with claim 10 in which said housing has a generally arcuate floor.

12. An in-line storm water drain filter system in accordance with claim 11 in which said housing is made of a polymer material.

13. An in-line storm water drain filter system in accordance with claim 11 in which said housing is made of concrete.

* * * * *